(12) United States Patent
Tanaka

(10) Patent No.: US 6,519,100 B1
(45) Date of Patent: Feb. 11, 2003

(54) OPTICAL PICK-UP APPARATUS

(75) Inventor: Hidetoshi Tanaka, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/857,443

(22) PCT Filed: Oct. 12, 2000

(86) PCT No.: PCT/JP00/07084

§ 371 (c)(1),
(2), (4) Date: Sep. 12, 2001

(87) PCT Pub. No.: WO01/27918

PCT Pub. Date: Apr. 19, 2001

(30) Foreign Application Priority Data

Oct. 12, 1999 (JP) ............................................ 11/289175

(51) Int. Cl.$^7$ ................................................. G02B 7/02
(52) U.S. Cl. ......................................... 359/824; 359/814
(58) Field of Search ................................. 359/813, 814, 359/822, 823, 824; 369/44.14, 44.15, 44.16

(56) References Cited

U.S. PATENT DOCUMENTS

| 5,627,687 A | * | 5/1997 | Fujisawa | 359/823 |
| 5,636,068 A | | 6/1997 | Tanaka | 359/814 |
| 5,903,539 A | * | 5/1999 | Tanaka | 396/221 |
| 5,926,327 A | * | 7/1999 | Bae | 359/824 |
| 6,317,277 B1 | * | 11/2001 | Izumino et al. | 359/813 |
| 6,377,407 B1 | * | 4/2002 | Susukii et al. | 359/814 |

FOREIGN PATENT DOCUMENTS

| JP | 6-96469 | 4/1994 |
| JP | 9-282687 | 10/1997 |
| JP | 11-232679 | 8/1999 |
| JP | 2000-149293 | 5/2000 |

* cited by examiner

Primary Examiner—Georgia Epps
Assistant Examiner—Saeed Seyrafi
(74) Attorney, Agent, or Firm—Rader, Fishman & Grauer PLLC; Ronald P. Kananen, Esq.

(57) ABSTRACT

An optical pick-up device adapted for irradiating light beams onto an optical disc to carry out recording or reproduction of information signals with respect to the optical disc. A movable portion in which coils for drive are provided at a lens holder of synthetic resin which holds an object lens is displaceably supported at a fixing portion including magnets opposite to the drive coils through suspensions doubling as electric current supply medium from an external circuit. At the lens holder, there are provided conductive portions formed by the resin plating method. End portions of the drive coils and one ends of the suspensions are soldered to the conductive portions, thus to carry out mechanical supporting with respect to the fixing portion of the movable portion and electric connection with respect to the external circuit of the drive coils.

6 Claims, 4 Drawing Sheets

OPTICAL PICK-UP APPARATUS

This application is the national stage #371 of PCT/JP00/07084 dated Nov. 12, 2000.

TECHNICAL FIELD

This invention relates to an optical pick-up device, and more particularly to an optical pick-up device used for irradiating light beams onto an optical disc caused to undergo rotational operation to carry out recording of information signals onto the optical disc, or to carry out reproduction of information signals recorded on the optical disc.

BACKGROUND ART

Hitherto, optical pick-up devices used for carrying out recording of information signals with respect to an optical disc, or for reproducing information signals recorded on the optical disc includes an object lens (objective) for converging light beams emitted from light source to irradiate them onto signal recording surface of the optical disc, and is further provided with a movable portion for allowing the object lens to undergo drive displacement in a focusing direction in parallel to the optical axis thereof and in a tracking direction of plane direction perpendicular to the optical axis, and a fixing portion for supporting this movable portion. The movable portion includes drive coils, i.e., focusing coil and tracking coil.

In this case, in order to allow the object lens to undergo drive displacement in the focusing direction and in the tracking direction so that light beams focus on the signal recording surface of the optical disc to follow recording tracks, it is necessary to deliver, from the external, drive currents corresponding to focusing error signal and tracking error signal to the drive coils constituting the movable portion.

As the optical pick-up device adapted for delivering current from the outside of the device to the drive coils of the movable portion, there are optical pick-up devices as shown below.

An optical pick-up device 101 shown in FIGS. 1 and 2 comprises a movable portion 107 in which printed wiring boards for connection 106, 106 are attached at a lens holder 105 which has held an object lens 102, a focusing coil 103 and tracking coils 104, 104. This movable portion 107 is supported so that it is permitted to undergo displacement in a direction in parallel to the optical axis of the object lens 102 and in a plane direction perpendicular to the optical axis through four suspensions 110 having bottom end portions supported by a fixing portion 108 and connected to a printed wiring board 109 for external connection supported at the fixing portion 108. By soldering front end portions of the four suspensions 110 which have displaceably supported the movable portion 107 and end portions of the focusing coil 103 and the tracking coils 104 with respect to the printed wiring boards for connection 106, 106, supporting with respect to the fixing portion 108 of the movable portion 107 and electrical conduction to the outside of the device of the respective coils 103, 104, 104 are realized.

Moreover, in an optical pick-up device 201 shown in FIGS. 3 and 4, there are provided in a projected manner (hereinafter simply referred to as projected as occasion may demand) plural coil binding projections 206 at a lens holder 205 which has held an object lens 202, a focusing coil 203 and plural tracking coils 204 to constitute a movable portion 207 to bind end portions of the respective coils 203 and 204 with respect to predetermined coil binding projections 206 to solder thereat front end portions of four suspensions 210 having bottom end portions supported by a fixing portion 208 and connected to a printed wiring board 209 for external connection supported by the fixing portion 208 to realize supporting with respect to the fixing portion 208 of the movable portion 207 and electric conduction to the device outside of the respective coils 203, 204.

Meanwhile, in the optical pick-up device 101 shown in FIGS. 1 and 2, it is necessary to provide printed boards 106 for connection. As a result, the number of parts is increased. Further, space for providing the connection printed boards 106 is required. Thus, not only weight of the device itself is increased, but also the device itself becomes large sized. Further, since the connection printed board 106 is attached at the lens holder 105 by, e.g., adhesive agent, there results lowered responsibility resulting from change with passage of time of adhesive agent. In addition, there occurs increase in the number of assembling steps. This might also give the cause to increase production cost.

Further, the optical pick-up device 201 shown in FIGS. 3 and 4 requires projections like coil binding projections 206 at the lens holder 205. Thus, miniaturization is prevented as the result of the fact that such projections are provided. In addition, working for binding end portions of the coils 203, 204 at the coil binding projections 206 is required. These results the increased number of assembling steps. This also constitute the cause that the manufacturing cost is increased.

An object of this invention is to provide a novel optical pick-up device which can solve the technical problems that the conventional optical pick-up devices have.

Another object of this invention is to provide an optical pick-up device which can reduce the number of parts, and realize light weight and miniaturization.

In the optical pick-up device according to this invention proposed in order to attain such objects, a movable portion in which drive coil is provided at a lens holder of synthetic resin for holding an object lens is supported at a fixing portion having magnet opposite to the drive coil through suspensions doubling as electric current supply medium from external circuit. Further, conductive portions formed by the resin plating method are provided at the lens holder to solder end portion of the drive coil and one ends of the suspensions to the conductive portions to realize supporting with respect to the fixing portion of the movable portion and electric connection with respect to an external circuit of the drive coil.

In accordance with this optical pick-up device, the end portion of the drive coil and one ends of suspensions are soldered to the conductive portion integrally provided at the lens holder so that supporting with respect to the fixing portion of the movable portion and electric connection with respect to the external circuit of the drive coil are realized. Accordingly, the number of parts is reduced and miniaturization of the device itself is realized. In addition, since reduction in the number of parts is realized, the number of assembling steps is reduced. Thus, reduction in the manufacturing cost can be realized.

BEST MODE FOR CARRYING OUT THE INVENTION

An optical pick-up device according to this invention will now be described with reference to the attached drawings.

Figure 1:
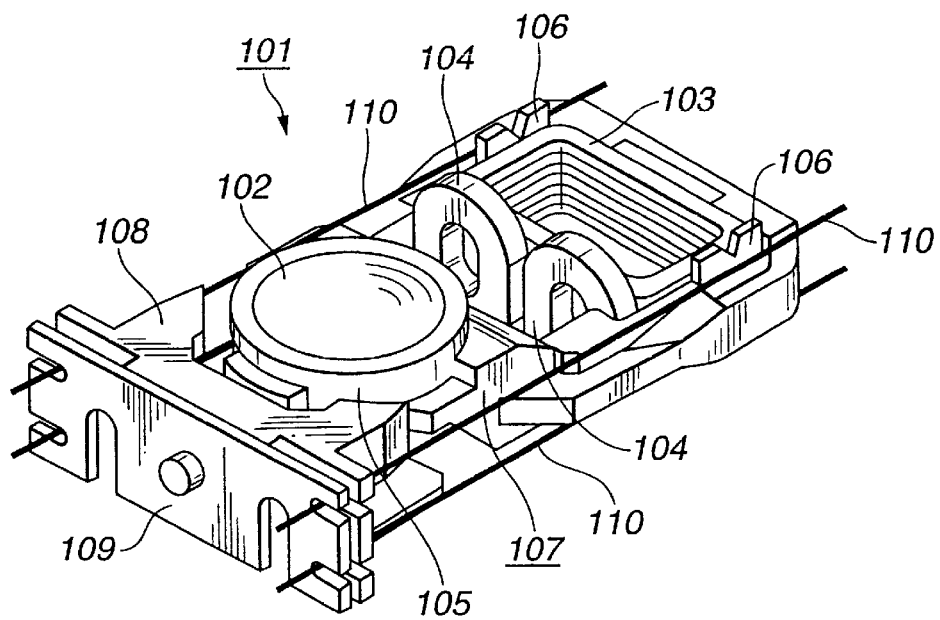
FIG. 1 is a schematic perspective view showing an example of a conventional optical pick-up device.
Figure 2:
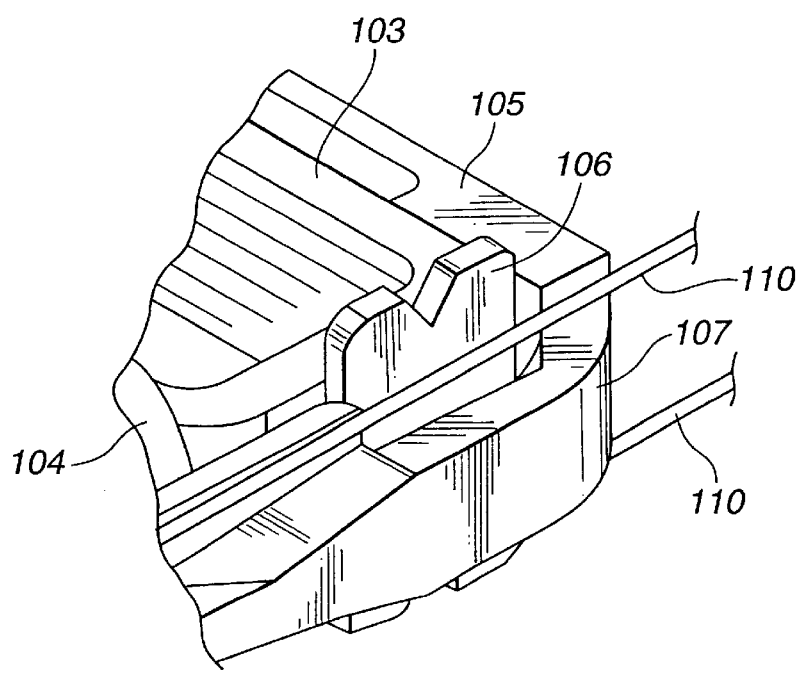
FIG. 2 is an essential part enlarged perspective view thereof.
Figure 3:
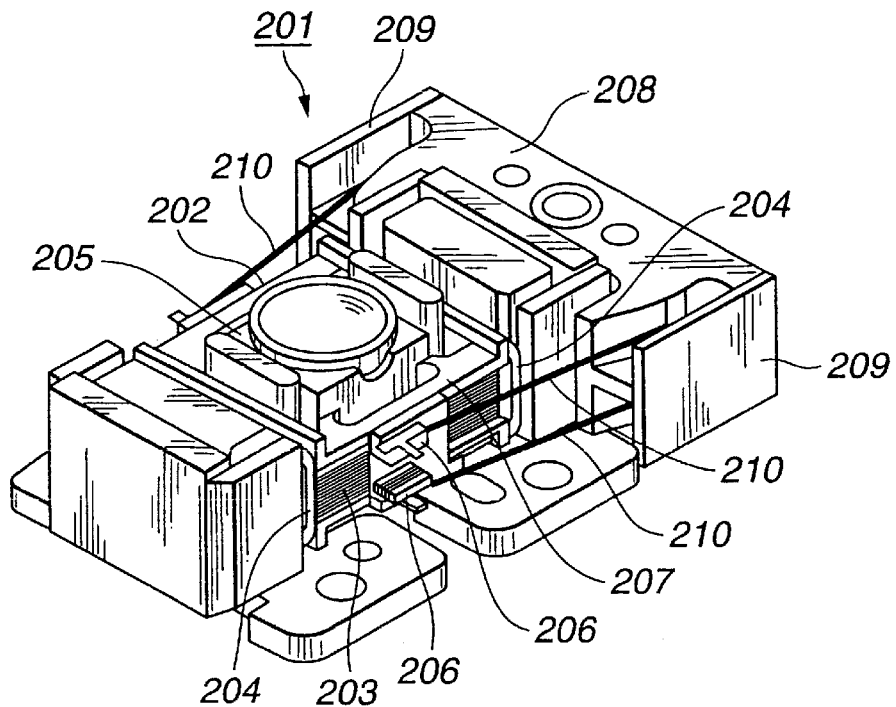
FIG. 3 is a schematic perspective view showing another example of a conventional optical pick-up device.
Figure 4:
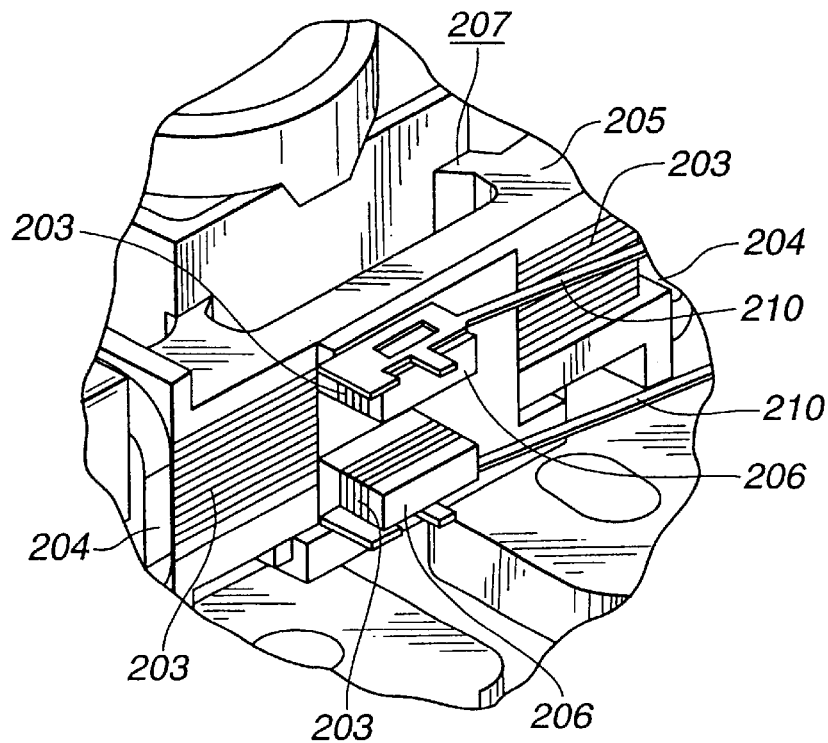
FIG. 4 is an essential part enlarged perspective view thereof.
Figure 5:
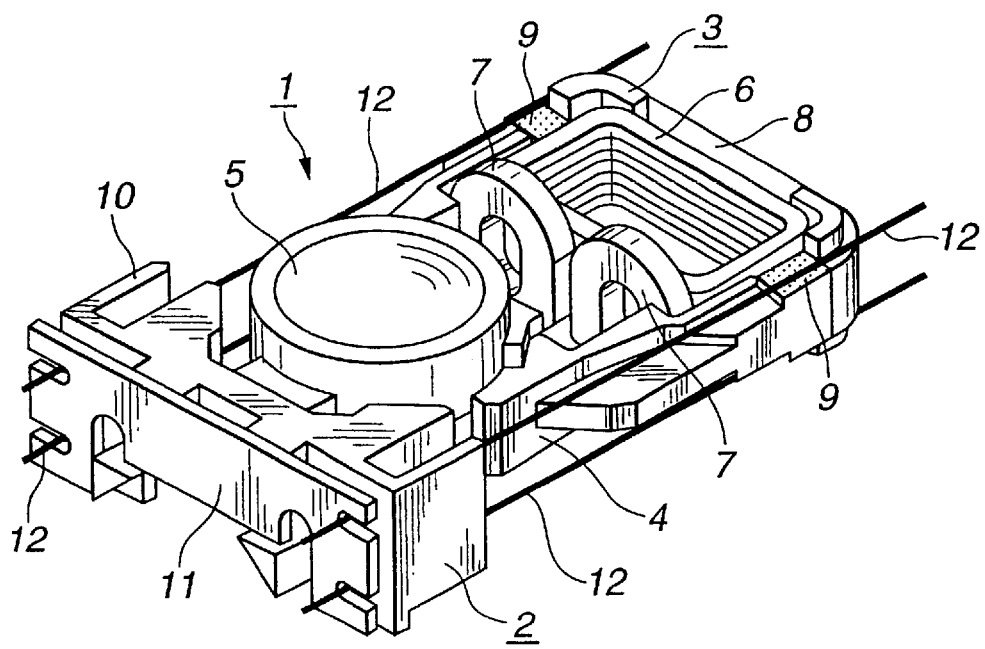
FIG. 5 is a schematic perspective view showing an example of an optical pick-up device according to this invention.

The optical pick-up device 1 according to this invention comprises a fixing portion 2 and a movable portion 3 as shown in FIG. 5.

The movable portion 3 is constituted by supporting an object lens 5 at a lens holder 4 formed by synthetic resin to attach a focusing coil 6 and tracking coils 7, 7. At the lens holder 4, there is formed a frame-shaped coil holding portion 8 in a manner adjacent to the portion at which the object lens 5 is supported. At the inside of the coil holding portion 8, the focusing coil 6 is adhered (bonded). In addition, at the side surface of the side of the object lens 5 of the focusing coil 6, there are adhered (bonded) the tracking coils 7, 7.

Figure 6:
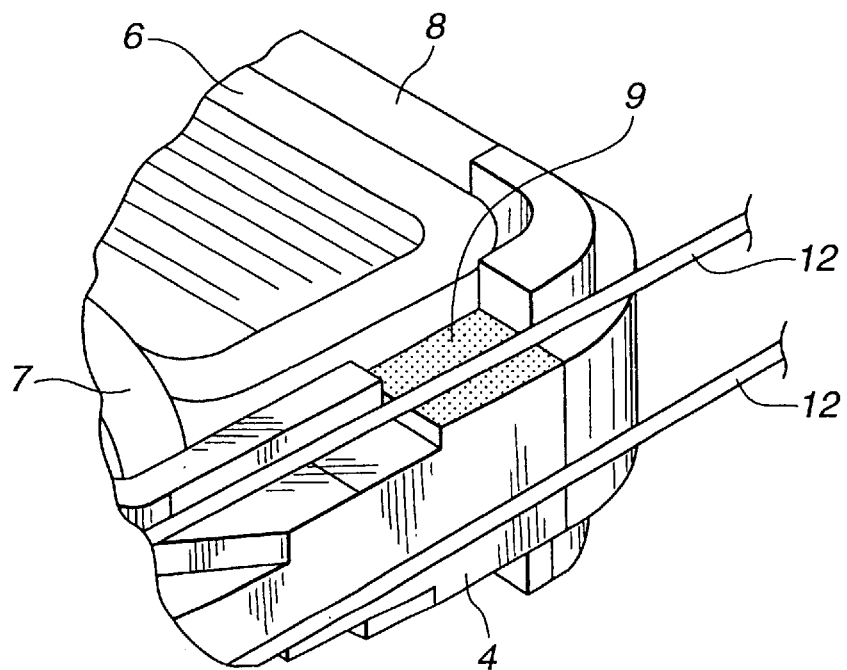
FIG. 6 is an essential part enlarged perspective view thereof.

At four portions in total of upper and lower both surfaces corresponding to both side portions of the focusing coil 6 of the coil holding portion 8, there are respectively formed conductive portions 9 formed by the resin plating method as shown in FIG. 6. The resin plating method which forms these conductive portions 9 is a method of generally allowing the portion to be plated to be rough surface to precipitate conductive metal by the catalytic method at the portion caused to be rough surface.

Meanwhile, as an optical pick-up device used for compact optical disc recording/reproducing apparatus, there is used an extremely compact optical pick-up device in correspondence with the recording/reproducing apparatus. The coil holding portion 8 constituting such compact optical pick-up device 1 is also extremely compact, and the conductive portions 9 provided at this coil holding portion 8 are formed at extremely very small portions. It is difficult to allow the extremely very small portion of synthetic resin mold product to be rough surface to apply catalyzer thereto even if high level technology such as fine masking technology, etc. is employed.

In view of the above, an approach is employed to form primary mold product by synthetic resin in which rough surface can be realized by acid or alkali liquid to allow the entire surface of this primary mold product to be rough surface to apply catalyzer such as palladium chloride, etc. thereto. Further, the primary mold product is inserted into the mold for secondary mold to implement secondary molding thereto so that only the portions in which conductive portions are formed are exposed to the surface to precipitate conductive metal by the chemical plating method at the portion exposed to the surface and to which catalyzer is applied thereto, thus to conductive portions 9. By employing this approach, it is possible to form the conductive portions 9 with good accuracy and at a low cost. In this case, even if there is conducted waste such that catalyzer is implemented onto the portions which do not serve as conductive portion 9, it is possible to form more extremely inexpensively the conductive portions 9 as compared to the fact that difficult work such that fine masking is implemented to very small parts is carried out. In addition, since the entire surface of the primary mold product is caused to be rough surface, the synthetic resin portion formed by the secondary molding is firmly tightly in contact with the primary mold product so that physical strength is high.

It is to be noted that it is preferable that synthetic resin used in the primary molding and synthetic resin used in the secondary molding have the same coefficient of thermal expansion and have heat-resistance and high fluidity. As synthetic resion to satisfy such conditions, there is, e.g., liquid crystal polymer. However, such synthetic resin is not limited to this liquid crystal polymer.

The fixing holder 2 includes a fixing portion holder 10. A printed wiring board 11 for external connection is fixed to the fixing portion holder 10, and circuit pattern formed at the external connection printed wiring board 11 is electrically connected to biaxial drive circuit by connection member (not shown).

The bottom end portions of thin linear four suspensions 12 consisting of material having conductivity and spring elasticity are soldered to respective connection terminals of the external connection printed wiring board 11. Thus, supporting with respect to the fixing portion 2 and electric connection with respect to circuits on the external connection printed wiring board 11 are realized.

End portions of respective coils 6, 7 are soldered to the predetermined conductive portions 9. The relationship between end portions of the coils 6, 7 and conductive portions 9 to which those end portions are connected is determined in consideration of efficiency and performance. For example, one end of the focusing coil 6 is soldered to the conductive portion 9 of the upper side of one end portion, the other end of the focusing coil 6 is soldered to the conductive portion 9 of the lower side, one ends of the tracking coils 7, 7 are soldered to the conductive portions 9 of the upper side of the other side portion, and the other ends of the tracking coils 7, 7 are soldered to the conductive portions 9 of the lower side, etc.

Further, the other end portions of the four suspensions 12 are individually soldered to the respective conductive portions 9, whereby supporting with respect to the fixing portion 2 by the suspensions 12 of the movable portion 3 and electric connection with respect to the biaxial drive circuit through the suspensions 12 and the external connection printed wiling board 11 of the respective coils 6, 7 are realized.

It is to be noted that soldering with respect to respective conductive portions 9 of end portions of the respective coils 6, 7 and soldering with respect to respective conductive portions 9 of the respective suspensions 12 may be carried out by single soldering, i.e., co-soldering (common soldering).

In addition, while magnetic field producing magnets for supplying magnetic field to respective coils 6, 7 are provided at the fixing portion 2, illustration thereof is omitted in FIGS. 5 and 6.

Figure 7:
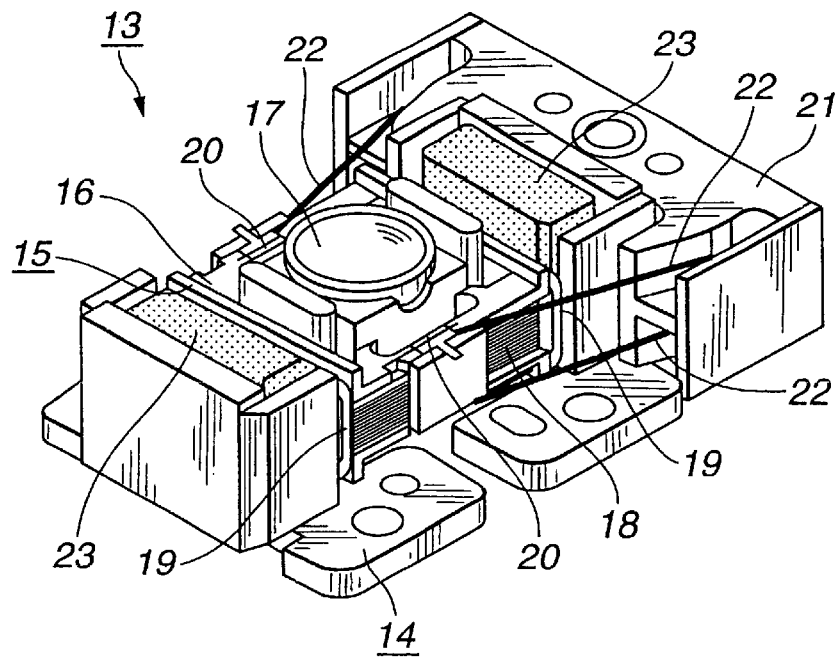
FIG. 7 is a schematic perspective view showing another example of an optical pick-up device according to this invention.
Figure 8:
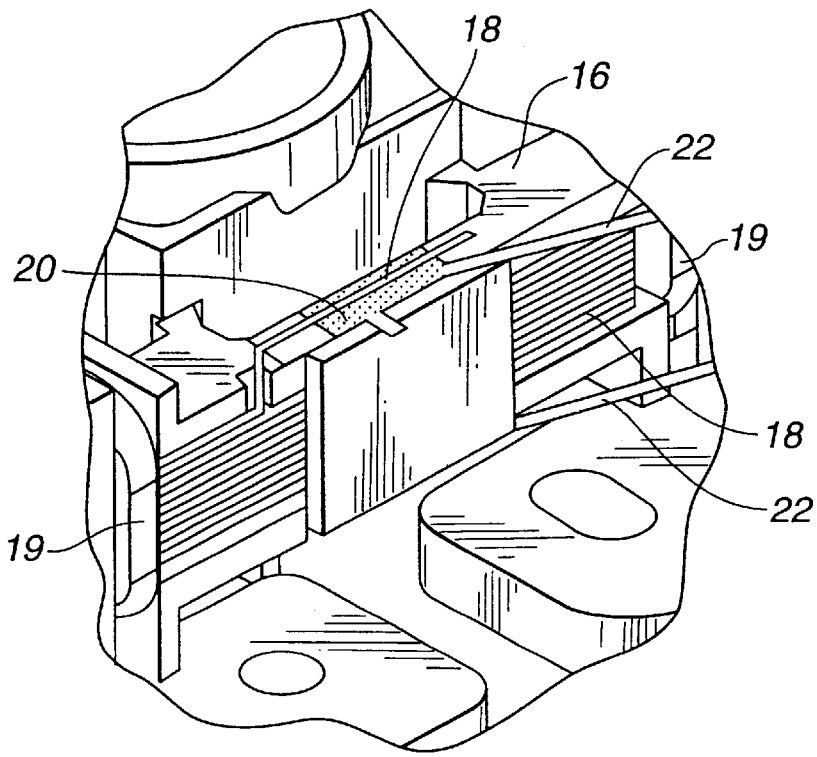
FIG. 8 is an essential part enlarged perspective view thereof.

FIGS. 7 and 8 show another example of the optical pick-up device according to this invention, and the optical pick-up device 13 shown in FIGS. 7 and 8 also comprises a fixing portion 14 and a movable portion 15 similarly to the above-mentioned optical pick-up device 1.

The movable portion 15 is constituted by supporting an object lens 17 at a lens holder 16 formed by synthetic resin to attach a focusing coil 18 and plural tracking coils 19, 19.

The lens holder 16 is formed to be substantially rectangular, wherein the object lens 17 is supported at the central portion thereof. On the outer circumference of this lens holder 16, the focussing coil 18 is provided in such a manner that it is wound. At portions before and after this focussing coil 18, the tracking coils 19 are adhered (bonded).

Further, at four portions in total of upper and lower both surfaces of both side portions of the lens holder 16, conductive portions 20 formed by the resin plating method are respectively formed as shown in FIG. 8.

The fixing portion 14 includes a fixing portion holder 21, wherein bottom end portions of thin linear four suspensions 22 consisting of material having conductivity and spring elasticity are supported by the fixing portion holder 21, and are electrically connected to biaxial drive circuit of the outside by connecting means (not shown).

End portions of the respective coils 18, 19 attached at the lens holder 16 are respectively soldered to predetermined conductive portions 20. The relationship between end portions of coils 18, 19 and conductive portions 20 to which they are soldered is determined in consideration of efficiency and performance similarly to the above.

In addition, the other end portions of four suspensions 22 in which bottom end portions are fixed to the fixing portion holder 21 are individually soldered to the respective conductive portions 20, whereby supporting with respect to the fixing portion 14 by the suspensions 22 of the movable portion 15 and electric connection with respect to biaxial drive circuit through the suspensions 22 of the respective coils 18, 19 are realized.

It is to be noted that soldering with respect to respective conductive portions 20 of end portions of respective coils 18, 19 and soldering with respect to respective conductive portions 20 of respective suspensions 22 may be carried out by single soldering, i.e., co-soldering (common soldering).

In addition, at the fixing portions 14, as shown in FIG. 7, magnets 23, 23 for producing magnetic field are disposed in a manner opposite to each other.

In accordance with the above-described optical pick-up device 1, 13 according to this invention, end portions of the drive coils 6, 7; 18, 19 are soldered to the conductive portions 9, 20 formed by the resin plating method at the lens holders 4, 16, and the other end portions of the suspensions 12, 22 of which bottom portions are supported by the fixing portions 2, 14 are soldered to the conductive portions 9, 20, whereby mechanical supporting with respect to the fixing portions 2, 14 of the movable portions 3, 15 and electric connection with respect to external circuit of the respective drive coils 6, 7; 18, 19 are carried out at the same time. Accordingly, reduction in the number of parts is realized. As a result, the number of assembling steps is decreased. Thus, reduction of manufacturing cost can be realized. Further, miniaturization and light weight of the device itself can be realized. In addition, since there is no necessity to use, e.g., adhesive agent which is remarkably deteriorated with age in regard to electric connection of drive coils 6, 7; 18, 19 and mechanical supporting with respect to fixing portions 2, 14 of movable portions 3, 15, reliability is improved.

It should be noted that shapes and structures of respective portions of the above-mentioned respective embodiments all only illustrate respective examples of the embodiments at the time of carrying out this invention, and various modifications may be made within the scope where the gist of this invention is not altered.

INDUSTRIAL APPLICABILITY

In the optical pick-up device according to this invention, end portions of the drive coils and one end portions of the suspensions are soldered to the conductive portions integrally provided at the lens holder, thereby making it possible to carry out, at the same time, mechanical supporting with respect to the fixing portion of the movable portion and electric connection with respect to external circuit of drive coil. Accordingly, the number of parts is reduced. As a result, the number of assembling steps is reduced, and reduction in the manufacturing cost can be thus made. In addition, miniaturization and light weight of the device itself can be realized.

What is claimed is:

1. An optical pick-up device including an object lens and adapted for allowing the object lens to undergo drive displacement in a desired direction, wherein a movable portion in which a drive coil is provided at a lens holder of synthetic resin which holds the object lens is supported at a fixing portion including a magnet opposite to the drive coil through suspensions doubling as an electric current supply medium from an external circuit, wherein conductive portions are formed on the lens holder and are fabricated from precipitate conductive metal to define a thin-film electrically conductive surface area covering and adhering in direct facial contact to the lens holder, and wherein an end portion of the drive coil and respective ends of the suspensions are soldered to the respective conductive portions to realize supporting with respect to the fixing portion and the movable portion and electric conduction with respect to the external circuit.

2. The optical pick-up device as set forth in claim 1, wherein the movement directions of the object lens are two directions, a first direction in parallel to an optical axis of the object lens and a second direction perpendicular to the optical axis of the object lens, and the drive coil including a focusing coil and a tracking coil.

3. The optical pick-up device as set forth in claim 1, wherein the end portion of the drive coil and the respective end portions of the suspensions are fixed to the respective conductive portions by solder.

4. The optical pick-up device as set forth in claim 1, wherein the conductive portions are formed by a resin plating method.

5. An improved optical pick-up device including an optical pick-up body fabricated from a synthetic resin and having at least one rough surface portion, the improvement comprising:

at least one conductive portion fabricated from precipitate conductive metal defining a thin-film electrically conductive surface area, the at least one conductive portion covering and adhering in direct facial contact to the at least one rough surface portion of the optical pick-up body.

6. The improved optical pick-up device as set forth in claim 5, wherein the conductive portions are formed by a resin plating method.

* * * * *